United States Patent
Ceravolo et al.

(10) Patent No.: US 12,079,117 B2
(45) Date of Patent: Sep. 3, 2024

(54) SCENARIO TESTING AGAINST PRODUCTION DATA FOR SYSTEMS PROVIDING ACCESS MANAGEMENT AS A SERVICE

(71) Applicant: Pax8, Inc., Greenwood Village, CO (US)

(72) Inventors: Tony Ceravolo, Denver, CO (US); Cody Hanson, Greenbay, WI (US); Jeffrey Wise, Colorado Springs, CO (US); Travis Cartwright, Arvada, CO (US)

(73) Assignee: PAX8, INC., Greenwood Village, CO (US)

( * ) Notice: Subject to any disclaimer, the term of this patent is extended or adjusted under 35 U.S.C. 154(b) by 88 days.

(21) Appl. No.: 17/893,759

(22) Filed: Aug. 23, 2022

(65) Prior Publication Data

US 2023/0350793 A1    Nov. 2, 2023

Related U.S. Application Data

(60) Provisional application No. 63/335,337, filed on Apr. 27, 2022.

(51) Int. Cl.
   *G06F 11/36*    (2006.01)
   *H04L 67/53*    (2022.01)

(52) U.S. Cl.
   CPC ...... *G06F 11/3688* (2013.01); *G06F 11/3664* (2013.01); *H04L 67/53* (2022.05)

(58) Field of Classification Search
   CPC ... G06F 11/3688; G06F 11/3664; H04L 67/53

USPC .................................................. 717/120–178
   See application file for complete search history.

(56) References Cited

U.S. PATENT DOCUMENTS

| 10,747,556 | B2* | 8/2020 | Kashyap | G06F 8/38 |
| 11,074,475 | B2* | 7/2021 | Coven | G06F 8/60 |
| 11,727,320 | B2* | 8/2023 | Cella | G06Q 10/04 |
| | | | | 712/216 |
| 2013/0007773 | A1* | 1/2013 | Guilford | G06F 9/541 |
| | | | | 719/328 |
| 2013/0024424 | A1* | 1/2013 | Prahlad | G06F 16/1827 |
| | | | | 707/694 |
| 2020/0120082 | A1* | 4/2020 | Cybulski | H04L 63/20 |
| 2020/0159917 | A1* | 5/2020 | Cervantez | G06F 21/562 |

(Continued)

OTHER PUBLICATIONS

Datta, Pubali, et al. "Valve: Securing function workflows on serverless computing platforms." Proceedings of The Web Conference 2020. pp. 939-950 (Year: 2020).*

(Continued)

*Primary Examiner* — Satish Rampuria
(74) *Attorney, Agent, or Firm* — Brownstein Hyatt Farber Schreck, LLP

(57) ABSTRACT

A system and method for providing access to third-party application programming interfaces (APIs) as a service. In particular, an API access manager can be configured to execute one or more serverless functions selected form a database of serverless functions in order to obtain data from one or more third-party APIs. Execution of different versions of the serverless functions (e.g., original and refactored) can be compared to determine whether the versions are equivalent and deterministic.

20 Claims, 6 Drawing Sheets

(56) References Cited

U.S. PATENT DOCUMENTS

2021/0233045 A1\* 7/2021 Singh ............... G06Q 20/12

OTHER PUBLICATIONS

Pérez, Alfonso, et al. "A programming model and middleware for high throughput serverless computing applications." Proceedings of the 34th ACM/SIGAPP symposium on applied computing. 2019. pp. 106-113 (Year: 2019).\*
Pelle, István, et al. "Operating latency sensitive applications on public serverless edge cloud platforms." IEEE Internet of Things Journal 8.10 (2020): pp. 7954-7972. (Year: 2020).\*
Christidis, Angelos, et al. "Enabling serverless deployment of large-scale ai workloads." IEEE Access 8 (2020): pp. 70150-70161. (Year: 2020).\*
Kuhlenkamp, Jörn, et al. "Benchmarking elasticity of FaaS platforms as a foundation for objective-driven design of serverless applications." Proceedings of the 35th Annual ACM Symposium on Applied Computing. 2020. pp. 1576-1585 (Year: 2020).\*
Bardsley, Daniel, Larry Ryan, and John Howard. "Serverless performance and optimization strategies." 2018 IEEE International Conference on Smart Cloud (SmartCloud). IEEE, 2018. pp. 19-26 (Year: 2018).\*

\* cited by examiner

SCENARIO TESTING AGAINST PRODUCTION DATA FOR SYSTEMS PROVIDING ACCESS MANAGEMENT AS A SERVICE

CROSS-REFERENCE TO RELATED APPLICATION(S)

This application is a nonprovisional patent application of and claims the benefit of U.S. Provisional Patent Application No. 63/335,337, filed Apr. 27, 2022 and titled "Scenario Testing Against Production Data for Systems Providing Access Management as a Service," the disclosure of which is hereby incorporated herein by reference in its entirety.

TECHNICAL FIELD

Embodiments described herein relate to access management systems and, in particular, to systems and methods for testing and verification of access management system functionality.

BACKGROUND

An organization may provide its employees with access to one or more software tools to facilitate collaboration and completion of work. Typically, an organization licenses access to such software tools, for each employee, from one or more third-party software providers or vendors. In some examples, an organization may engage a managed service provider (MSP) to administer and manage access to third-party software tools licensed by the organization.

However, managing licenses and billing for multiple different third-party software providers is often a cumbersome and time consuming process for both MSPs and organizations alike, often resulting in inefficient over-purchasing (e.g., over-licensing) by organizations. For example, it may be difficult to reliably obtain cross-organization, multi-vendor, per-license usage metrics from multiple third-party software provider APIs.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
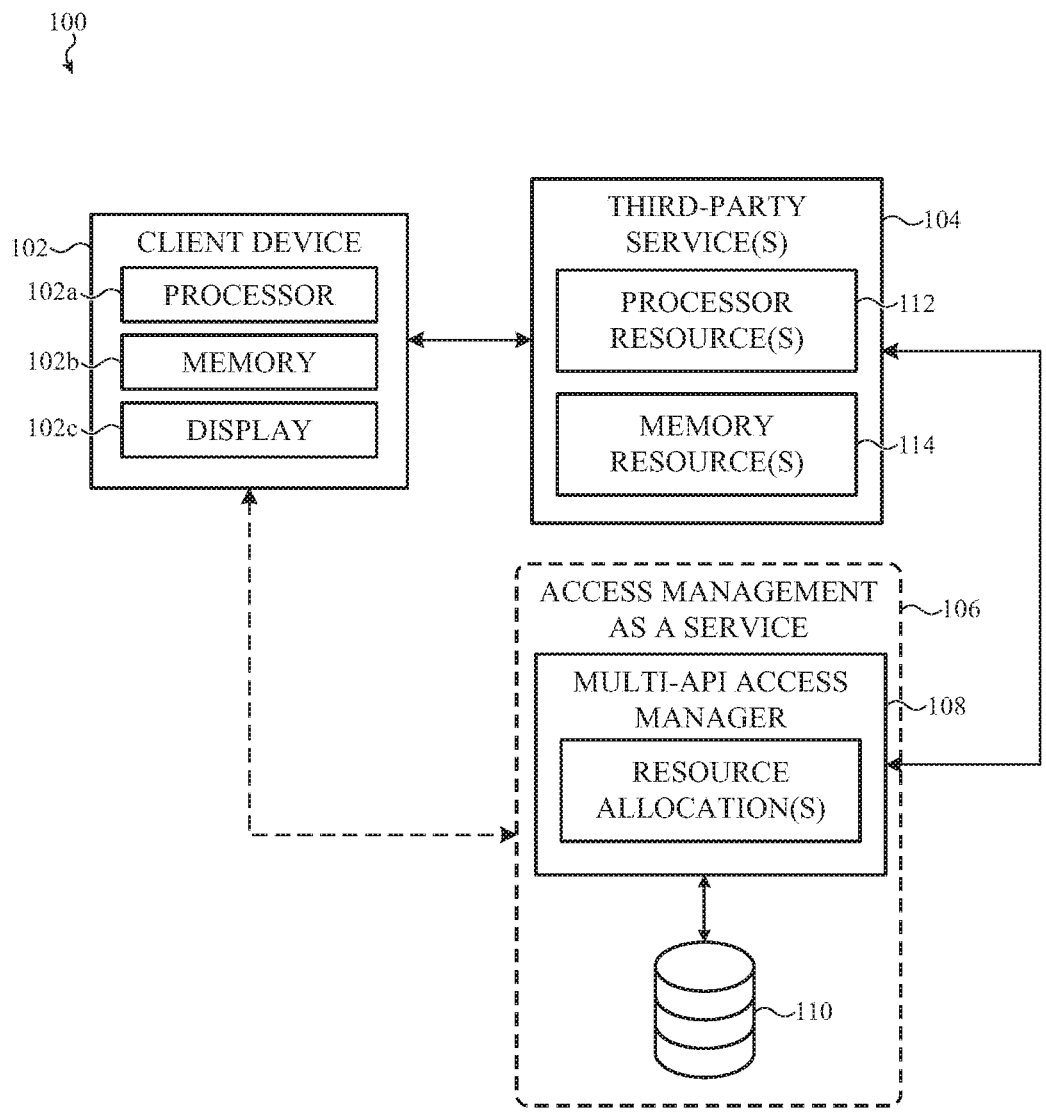
FIG. 1 depicts a system for providing access management as a service, such as described herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to computing systems, computer architectures, and computer-implemented methods configured to provide, control, and manage access to third-party software tools. More specifically, a system described herein facilitates access to one or more third-party software provider API endpoints so that scenario testing can be performed by the system against production data stored by one or more third-party systems.

As noted above, an organization may engage an MSP and/or a value-added reseller (VAR) to license access to, and/or to actively administer, one or more third-party software tools, which may be referred to herein as "collaboration tools." Example collaboration tools include email services, telephony services, instant messaging systems, documentation systems, word processing systems, IT management systems, ticketing systems, issue tracking systems, incident response systems, software repositories, and so on. A person of skill in the art may appreciate that these example collaboration tools are not exhaustive of all types of software tools that may be licensed by an organization for use by one or more employees.

In many cases, an organization may license access to collaboration tools developed and maintained by different third-party software providers (herein, software "vendors"). As an organization's collaboration tool library (and employee headcount) grow, licensing costs likewise increase as does the importance of active license management. Phrased in another manner, organizations and MSPs/VARs may be often tasked with regularly auditing whether licenses are being actively used to identify unused licenses that can be terminated.

In these examples, an organization, MSP, or VAR may leverage an API of a particular third-party software vendor to query whether particular licenses have been used in a given time window. The vendor's API may return data, in any particular form or format, including the requested usage information. With this information, an organization, MSP, or VAR can determine whether a particular license is a good candidate for termination.

In other cases, usage data may be leveraged by an organization, MSP, or VAR to generate, validate, and/or audit invoices received for use of one or more third-party software tools. For example, an MSP or VAR may leverage an API of a particular third-party software vendor in order to generate invoices for clients of the MSP (e.g.. organizations that have engaged the MSP).

However, as may be readily appreciated by a person of skill in the art, querying multiple API endpoints of multiple third-party APIs hundreds, if not thousands, of times (e.g., per employee and/or per license) on a regular basis to obtain information may be extremely time consuming and difficult to maintain for individual organizations, MSPs, or VARs. More specifically, it may be extremely time consuming for an MSP or VAR to regularly ensure that all API calls to all third-party APIs associated with all software licensed by a client of the MSP or VAR execute as expected, and that appropriate and accurate invoices are generated based on that information. Due to this burden, many MSPs and VARs manually generate invoices for their clients.

As an additional result of the complexities associated with maintaining reliable integrations with multiple third-party APIs, many organizations opt to manage license assignments and terminations manually and/or based on internal self-reporting, which can lead to inefficiencies such as over-purchasing.

Further still, because of the difficulties associated with capturing organization-wide usage information (whether for invoicing purposes, auditing purposes, or other purpose), it may be exceptionally difficult for an organization to understand whether switching software vendors for a particular product or product category, and/or otherwise modifying existing license arrangements (e.g., changing from per-seat licenses to per-access license, as one example) is a financially justifiable decision.

Embodiments described herein address these, and other inefficiencies, of conventional methods by providing third-party API access as a service, which can be leveraged by organizations, MSPs, and/or VARs to obtain information relating to a particular organization, particular software vendor (e.g., usage across multiple organizations), or particular user of multiple different software tools.

In particular, systems and methods described herein leverage a database of serverless functions, each specifically configured to, when executed, obtain particular data from a particular third-party API endpoint, and to provide particularly output based on that obtained data.

As a result of this construction, data corresponding to an organization's usage of multiple software tools—which are likely provided by multiple software vendors maintaining different APIs and data access protocols and data output formats—can be obtained reliably and quickly, and used to, in one example, generate accurate invoices (e.g., when leveraged by an MSP or VAR) or, in another example, audit license usage.

Generally and broadly, systems described herein facilitate access to one or more functionalities of third-party APIs by maintaining individual serverless functions, each configured to execute a discrete task against, or with, data provided by a third-party API or third-party API endpoint.

For example, a given serverless function may be configured to output a list of licenses associated with a particular software tool. In this example, when executed, the serverless function may authenticate to a third-party API (e.g., by obtaining a token, submitting a certificate or other credential, and so on), submit one or more requests to the API to obtain the list of licenses, and reformat the list of licenses as a JSON object, following a particular naming convention for attributes thereof. The serverless function can return the JSON object as output.

In another example, a given serverless function may be configured to output an integer count of failed logins to a particular service in a given time window. In this example, when executed, the serverless function may—as with other embodiments described herein—authenticate to a third-party API submit one or more requests to the API to obtain a list of failed logins. Thereafter, the serverless function may count elements of that list, and return the result of that operation as an integer output.

These foregoing example are not exhaustive; it may be appreciated that any suitable data may be output by any serverless function as described herein. Similarly, it may be appreciated that any serverless function as described herein can be configured to access any suitable API endpoint or combination of endpoints. A serverless function is not limited to obtain data from a single AP endpoint.

More generally, as may be appreciated, by discretizing access to specific features, functionality, and endpoints of third-party APIs in this manner, embodiments described herein greatly simplify processes associated with performing calculations and/or acting upon data served by hundreds, if not thousands, of differently-maintained API endpoints that may expect, as input, hundreds (if not thousands) of specifically-formatted arguments.

In other words, conventional monolithic API integrations often require significant maintenance and design attention, whereas maintaining a large of discrete serverless functions that are specially configured to call on required/necessary API endpoints is significantly more efficient. For example, a failed execution of a monolithic API integration may take significantly more time to debug, fix, and release than a failed execution of a single serverless function (as described herein), which includes only a small number of API calls.

A person of skill in the art likely appreciates that the foregoing described architecture can be leveraged by organizations for licensing auditing and can be leveraged by MSPs and VARs for both invoicing and license auditing. More specifically, for a given organization, a set of serverless functions can be selected from the serverless function database and can be executed in a defined order, a random order, or asynchronously. Results of the executions of the selected serverless functions can be aggregated and processed further as necessary.

In many embodiments, individual invocations of selected serverless functions can be wrapped into jobs (or "work items") and added to a job queue. A set of worker nodes can obtain work items from the job queue and execute each associated serverless function (with appropriate arguments for the particular invocation). When a worker node completes a job (e.g., executes all serverless functions associated with a particular job), results of the executions can be passed to a result aggregator for further processing.

For example, an MSP may leverage a system as described herein to obtain usage data for a particular client (e.g., organization) so as to generate invoices for that client. In this example, the system can identify a set of serverless functions necessary to generate usage statistics corresponding to the identified client. Thereafter, each selected serverless function can be packaged with appropriate arguments (e.g., arguments identifying the organization) as individual jobs. Each job can be added to the job queue, after which one or more worker nodes may execute each job, thereby causing execution/invocation of the selected serverless functions. A result aggregator can appropriately aggregate the usage statistics and provide the usage statistics as input to an invoicing system which, in turn, provides as output an invoice that the MSP can deliver to the client.

Further to the foregoing, embodiments described herein also relate to systems and methods for testing. For example, in some circumstances one or more serverless functions may be refactored and/or updated to a new version. For example, in some cases, a V1 of a particular serverless function may execute slowly; a refactoring of the serverless function as V2 may be required. In such circumstances, as may be appreciated by a person of skill in the art, execution of each of V1 and V2 should provide identical output. If identical output is not obtained, an error in the refactoring of V2 (or the original V1) may be presumed.

In these examples, results of execution of different versions of the same serverless function can be compared to verify that refactoring did not effect core functionality. In some cases, execution times of refactored code can be compared against execution times of original code to verify that refactoring provided a quantitative benefit.

As may be appreciated by a person of skill in the art, executing two versions of the same serverless function that calls on the same third-party API effectively tests execution of code against third-party production data (i.e., data served by the third-party API).

In this manner, a system as described herein operated in a scenario/test mode can be leveraged to perform a number of tests beyond comparing two versions of the same serverless function. For example, and without limitation, a system as described herein can be leveraged to simulate any suitable number of invoicing and/or licensing scenarios—all simulations thereof based on actual production data stored by relevant third-party software providers. In this manner, as a result of using actual production data (e.g., actual usage data), predictions and/or results of one or more scenario tests can be more precise.

For example, an organization or MSP/VAR may leverage a test mode of a system as described herein to determine whether switching to a different software provider is a reasonable decision. In another example, an organization or MSP/VAR may leverage a test mode of a system as described herein to predict invoice variations one or more billing cycles in advance. In another example, an organization or MSP/VAR may leverage a test mode of a system as described herein to determine whether to increase seat count or decrease seat count of a particular software product based on actual use of individual users. These foregoing examples are not exhaustive.

These foregoing and other embodiments are discussed below with reference to FIGS. 1-6. However, those skilled in the art will readily appreciate that the detailed description given herein with respect to these figures is for explanation only and should not be construed as limiting.

FIG. 1 depicts a system for providing access management as a service, such as described herein. The system 100 can include, in a simplified architecture, and or can be defined by communications by and between a client device 102, a third-party service 104, and an access management service 106.

The client device 102 can be any suitable electronic device. Examples include, but are not limited to cellular phones, laptop computers, desktop computers, server computers, and so on. More generally, the client device 102 may be any electronic device or computing resource configured to communicably intercouple (e.g., via one or more networks) to one or more other electronic devices, such as a server computer executing an instance of the third-party service 104 or a server computer executing an instance of the access management service 106.

In some cases, the access management service 106 can be operated to request licenses to use the third-party service 104 on behalf of a user of the client device 102. For example, the access management service 106 can be configured to leverage an API of the third-party service 104 to automatically request one or more licenses to access the third-party service 104.

In other cases, the access management service 106 can be operated to revoke and/or terminate licenses. For example, the access management service 106 can be configured to receive a request from the third-party service 104 and/or the client device 102 (or an organization admin associated with the client device 102 and/or a user of the client device 102) to terminate a previously-granted license.

In many constructions the access management service 106 and the third-party service 104 are each implemented as instances of software executing over one or more virtual or physical resources associated with a cloud-based infrastructure, such as may be provided by a cloud services provider. More specifically, in these embodiments, processing resources associated with, and/or allocated to, a particular server instance can cooperate with memory resources associated with the server instance to execute one or more computer readable instructions to instantiate an instance of software defining and/or implementing the third-party service 104 or the access management service 106.

More generally, although it may be appreciated that the access management service 106 and the third-party service 104 may be implemented in a number of ways and may be configured to communicate over a variety of protocols, in many embodiments each is implemented as a separate instance of cloud-based software.

It may be appreciated that the third-party service 104 can serve as a host of any suitable software product. Examples include, but are not limited to, email services, messaging services, instant messaging services, documentation services, office product services, word processing services, security services, and so on. These examples are not exhaustive.

As noted above, an access management service such as the access management service 106 can be configured to request and revoke software licenses to particular software products, such as to the third-party services 104.

In addition, the access management service 106 can be configured to facilitate access to one or more functionalities of one or more third-party APIs (such as API endpoints provided by the third-party service 104) by maintaining a database and/or data set of particularly-configured individual serverless functions, each configured to execute a discrete task against, or with, data provided by the third-party service 104.

More particularly, the access management service 106 can include an API access manager 108 in communication with a database 110 storing one or more serverless functions, such as described herein. As a result of this construction, the API access manager 108 can be configured to access to the database 110 to obtain one or more serverless functions, such as described above.

In some examples, the access management service 106 and/or the API access manager 108 can be leveraged by an MSP or VAR to generate invoices based on use of the third-party service 104 by a user of the client device 102. In other cases, the access management service 106 and/or the API access manager 108 can be leveraged by an MSP or VAR to generate invoices based on use of the third-party service 104 by an organization associated to the client device 102.

In addition, the API access manager 108 can be configured to operate in a test mode and/or a simulation mode such as described above. More particularly, the API access manager 108 can be configured to execute different versions of the same serverless function (such as an original version and a refactored version, or an API v1 version and an API v2 version) and to compare results thereof.

In an event that the API access manager 108 determines that two separate executions of serverless functions that should have produced identical results produced different results, the API access manager 108 and/or the access management service 106 may generate a notification indicating that an unexpected result was received.

Alternatively, in an event that the API access manager 108 determines that two separate executions of serverless functions that should have produced identical results produced identical results, the API access manager 108 and/or the access management service 106 may generate a notification indicating that both executions returned the same results.

It may be appreciated that the API access manager 108 can compare results of execution of serverless functions in a number of suitable ways. For example, in some embodiments, the API access manager 108 can be configured to provide input to a deterministic invoicing system and/or a deterministic business rules engine. Outputs from such systems can be compared for equality or, in some cases, inputs to such systems can be compared for equality. More generally, the API access manager 108 can be configured to perform comparisons at any suitable point.

In some cases, the API access manager 108 may be configured to determine that outputs of two executions of two serverless functions are identical if the outputs are not exact but are within a threshold quantity of one another. For example, the API access manager 108 can be configured to determine that a difference between an integer value output by a first serverless function and an integer output by a second serverless function is below a threshold. More generally, it may be appreciated that in some cases precise identity or equality may not be required.

In many embodiments, the API access manager 108 may be configured to operate in a test mode simultaneously with a normal operating mode (e.g., in which outputs from the system are provided as input to, for example, an invoicing system for automatic invoicing of a particular organization or MSP client). In such examples, a "test" or "simulation" flag may be appended as an attribute of a job corresponding to a particular invocation of a particular serverless function. In such examples, the API access manager 108 can be configured to monitor its output for such flags and, upon recognizing an output that is tagged as a simulation or test execution, the output can be diverted from further processing (e.g., by an invoicing system).

It may be appreciated, however, that tagging a particular job is merely one method of operating an API access manager such as the API access manager 108 as described herein. In other cases, the API access manager 108 can be configured to operate in test modes and normal modes at separate times. In some cases, the API access manager 108 may have different worker nodes configured to execute different jobs; some worker nodes may be configured to execute tests whereas other worker nodes are configured to execute jobs that do not reference test executions. Many configurations are possible.

As with other embodiments described herein, the API access manager 108 can be configured to create test jobs for scenario testing purposes. For example, the API access manager 108 can be operated to obtain usage data from one or more third-party services, such as the third-party service 104, and to apply a new business rule to those usage data to determine an effect (if any) on invoices generate from those data.

For example, a particular MSP may desire to understand the effect of issuing a coupon code for one its client organizations. In such an example, the API access manager 108 can be operated to create a set of jobs, each including at least one respective serverless function, which can be executed to obtain real-time usage data for the client organizations from a given time period, such as the last quarter or the last month. With this real-time, accurate, production data obtained from the third-party service 104, the API access manager 108 can apply the new business rule to change pricing according to the coupon code, informing the MSP of the effect of issuing such a code to the client.

Continuing this example, the API access manager 108 can be configured to determine calculations for the MSP for any suitable number of scenarios involving the proposed coupon code. For example, the API access manager 108 can be configured to provide output simulating/project effects of applying the coupon code to one product, multiple products, one user, multiple users, one day, one week, one month, and so on. In some examples, the API access manager 108 can be configured to simulate effects of the coupon code (or more generally any new business rule) over different times of a given billing year; for example the client organization may exhibit different usage data during different quarters of the year, and thus enabling a coupon code for different times of the year may result in different effects to the MSPs revenue.

In another example, a particular MSP may desire to understand the effect of increasing or decreasing pricing for a particular product used by multiple organizations. In such an example, the API access manager 108 can be operated to create a set of jobs, each including at least one respective serverless function, which can be executed to obtain real-time usage data for all client organizations using the selected product from a given time period, such as the last quarter or the last month. With this real-time, accurate, production data obtained from the third-party service 104, the API access manager 108 can apply the new business rules to change pricing of the product, informing the MSP of the effect of changing pricing.

In yet another example, a particular MSP may desire to understand the effect of increasing or decreasing pricing for a set or suite of products used by multiple organizations. In such an example, as with others provided herein, the API access manager 108 can be operated to create a set of jobs, each including at least one respective serverless function, which can be executed to obtain real-time usage data for all client organizations using all of the selected products from a given time period, such as the last quarter or the last month. With this real-time, accurate, production data obtained from the third-party service 104, the API access manager 108 can apply the new business rules to change pricing of the product suites, informing the MSP of the effect of changing pricing.

In yet another example, a particular MSP may desire to understand the effect of changing from per-user licensing to per-session pricing. As with other examples provided herein, the API access manager 108 can be operated to create a set of jobs, each including at least one respective serverless function, which can be executed to obtain real-time usage data for all or some client organizations using all or some of the selected products from a given time period, such as the last quarter or the last month. With this real-time, accurate, production data obtained from the third-party service 104, the API access manager 108 can apply the new business rules to change licensing structures of the product suites, informing the MSP of the effect of changing licensing structure.

In yet another example, a particular organization may desire to understand the effect of changing from per-user licensing to per-session pricing for a particular product or a set of products. As with other examples provided herein, the API access manager 108 can be operated to create a set of jobs, each including at least one respective serverless function, which can be executed to obtain real-time usage data for the organization using the current suite of products. With this real-time, accurate, production data obtained from the third-party service 104, the API access manager 108 can apply the new business rules to change licensing structures of the product suites, informing the organization of the effect of tested scenario.

In yet another example, a particular MSP, VAR or organization may desire to predict an invoice before it is issued. As with other examples provided herein, the API access manager 108 can be operated to create a set of jobs, each including at least one respective serverless function, which can be executed to obtain real-time usage data over a given time period, such as the last quarter or the last month. With this real-time, accurate, production data obtained from the third-party service 104, the API access manager 108 can feed usage data into an invoicing system to generate simulated invoices.

In yet another example, a particular entity (e.g., an MSP, VAR, or organization) may desire to back test a particular license change, software change, or other change. As with other examples provided herein, the API access manager 108 can be operated to create a set of jobs, each including at least one respective serverless function, which can be executed to obtain real-time and/or historical usage data over a given time period, such as the last quarter or the last month. With this real-time, accurate, production data obtained from the third-party service 104, the API access manager 108 can determine what effect a particular change would have had over a long period of time, such as multiple quarters or multiple years.

These foregoing embodiments depicted in FIG. 1 and the various alternatives thereof and variations thereto are presented, generally, for purposes of explanation, and to facilitate an understanding of various configurations and constructions of an access management system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, it may be appreciated that a third-party service such as the third-party service 104 can be implemented in a number of suitable ways. In many constructions, the third-party service 104 will be implemented as a cloud-based product that is supported by physical infrastructure including at least one processing resource 112 and at least one memory resource 114. The processing resource 112 and the memory resource 114 can cooperate to instantiate an instance of software that serves one or more API requests from the API access manager 108 and/or from the client device 102.

Further, it may be appreciated that the client device 102 can be configured in a number of suitable ways. In one embodiment, the client device 102 is an electronic device that includes a processor 102a, a memory 102b, and a display 102c. The processor 102a and the memory 102b cooperate to instantiate an instance of software that can be configured to communicate with and/or exchange information with the API access manager 108 and/or the third-party service 106. In some examples, the instance of software may be referred to as a client application and/or frontend that corresponds to a backend instance operated at the third-party service 104 and/or the API access manager 108.

The foregoing examples are not exhaustive; many constructions are possible.

Figure 2:
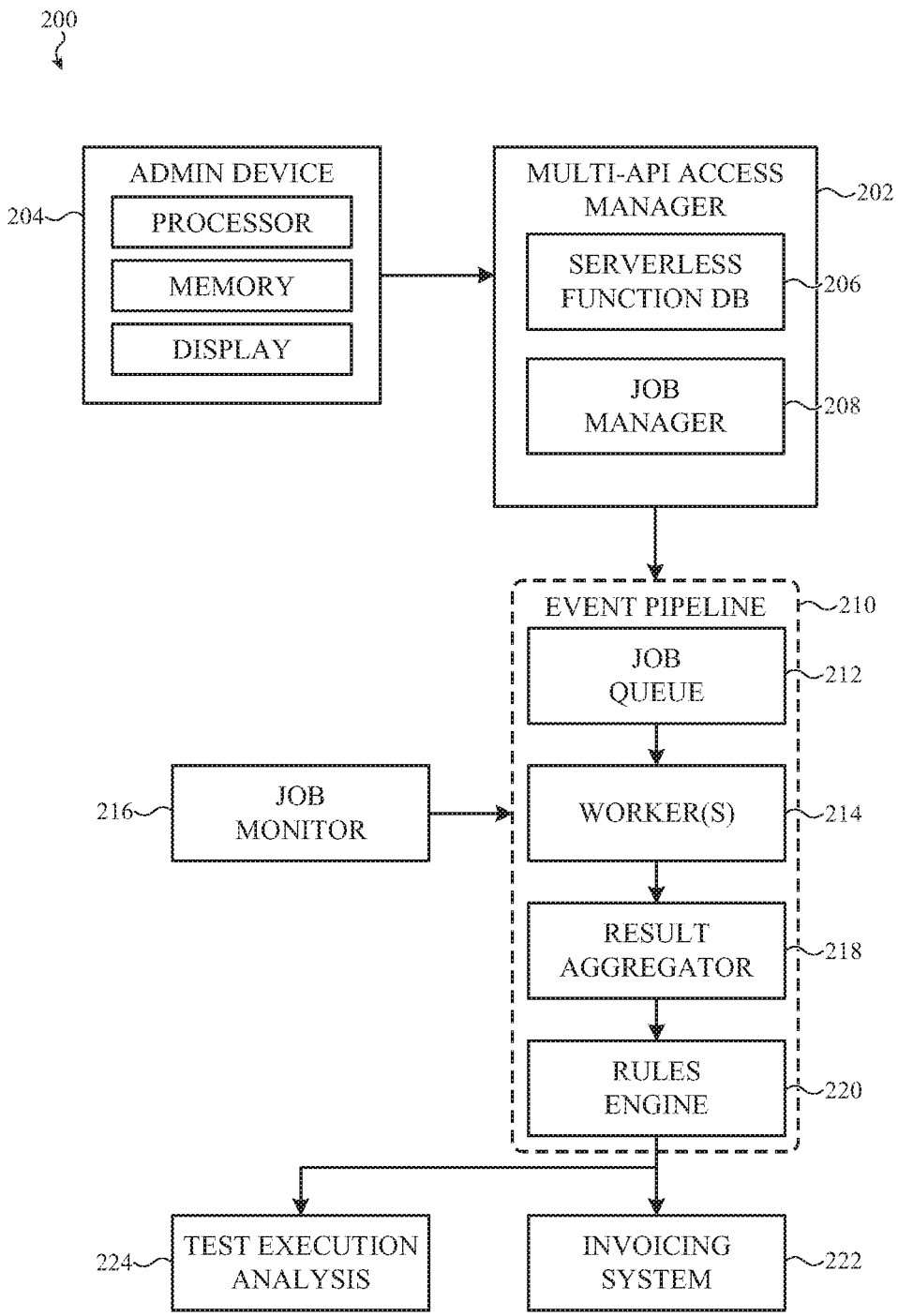
FIG. 2 depicts a system diagram of a system configured to facilitate scenario testing, of one or more operations of an access management service, against third-party production data.

FIG. 2 depicts a system diagram of a system configured to facilitate scenario testing, of one or more operations of an access management service, against third-party production data.

As with other embodiments described herein, the system 200 includes an API access manager 202 configured to receive command and control instructions from a device operated by an administrator, such as the administrator device 204. In many cases, the administrator device 204 can be an electronic device such as the client device 102 of FIG. 1; the administrator device 204 can include a processor, a memory, and/or a display that are configured to cooperate to instantiate an instance of software configured to receive command and control instructions from a user (admin) of the administrator device 204. More simply, the administrator device 204 can be configured in a similar manner as the client device 102 of FIG. 1; this description is not repeated.

The administrator device 204 can be configured to submit to the API access manager 202 one or more instructions, such as instructions to execute a particular test or simulation and/or instructions to operate in normal mode in which invoices may be generated (and/or other standard business operations may be performed).

Upon receiving an instruction from the administrator device 204, and/or in response to occurrence of a scheduled event, the API access manager 202 can be configured to access one or more serverless functions from a serverless function database 206. Each retrieved serverless function can thereafter be wrapped, with appropriate arguments, into a job by a job manager 208.

Each job created by the job manager 208 can be added as input to an event pipeline 210, which can include a job queue 212. Job items or work items can be added to and removed from the job queue 212 in any suitable order. One or more worker nodes 214 can be configured to pop jobs from the job queue 212 to execute those jobs/work items. In this manner individual serverless functions, armed with suitable arguments, can be executed in parallel and/or asynchronously.

In many cases, a job monitor 216 may be configured to monitor execution of each job by each worker node to determine whether the worker nodes execute jobs successfully. In an event that the job monitor 216 determines that a particular job has failed, a serverless function associated with the failed job can be flagged for review by a developer or maintainer of that serverless function. For example, the job monitor 216 may be configured to automatically create an issue in an issue tracking system such that a developer of the serverless function is automatically notified of the failed execution.

Once a job successfully executes, results of the execution can be passed to and/or otherwise received by a result aggregator 218. The result aggregator 218 can, in turn, bundle results of execution of one or more serverless functions (as jobs) as a single structured data object and can provide that structured data object as input to a rules engine 220, which may as described above, apply one or more client-specific and/or license-specific rules to the input data. For example, usage data obtained for a particular organization or user by a particular job from a particular third-party API can be provided as input to the rules engine 220 which may apply one or more client-specific and/or license specific rules to calculate a cost associated with that determined usage. In other words, different licenses may be negotiated differently; similar usage under different license structures may result in different costs, which may be applied by and/or managed by the rules engine 220.

Output from the rules engine 220 can be provided as input to an invoicing system 222 or to a test execution analysis system 224. In some cases, executions tagged (as noted above) as test executions can be diverted to the test execution analysis system 224 whereas executions that are not tagged as test executions can be passed directly to the invoicing system 222 to generate associated invoices.

Inputs provided to the test execution analysis system 224, as noted above, may be used to compare executions of two or more serverless functions that should produce identical results. In other cases, inputs provided to the test execution analysis system 224 may be used to simulate one or more licensing scenarios or business rules change scenarios. Many configurations and use cases are possible.

These foregoing embodiments depicted in FIGS. 1-2 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 3:
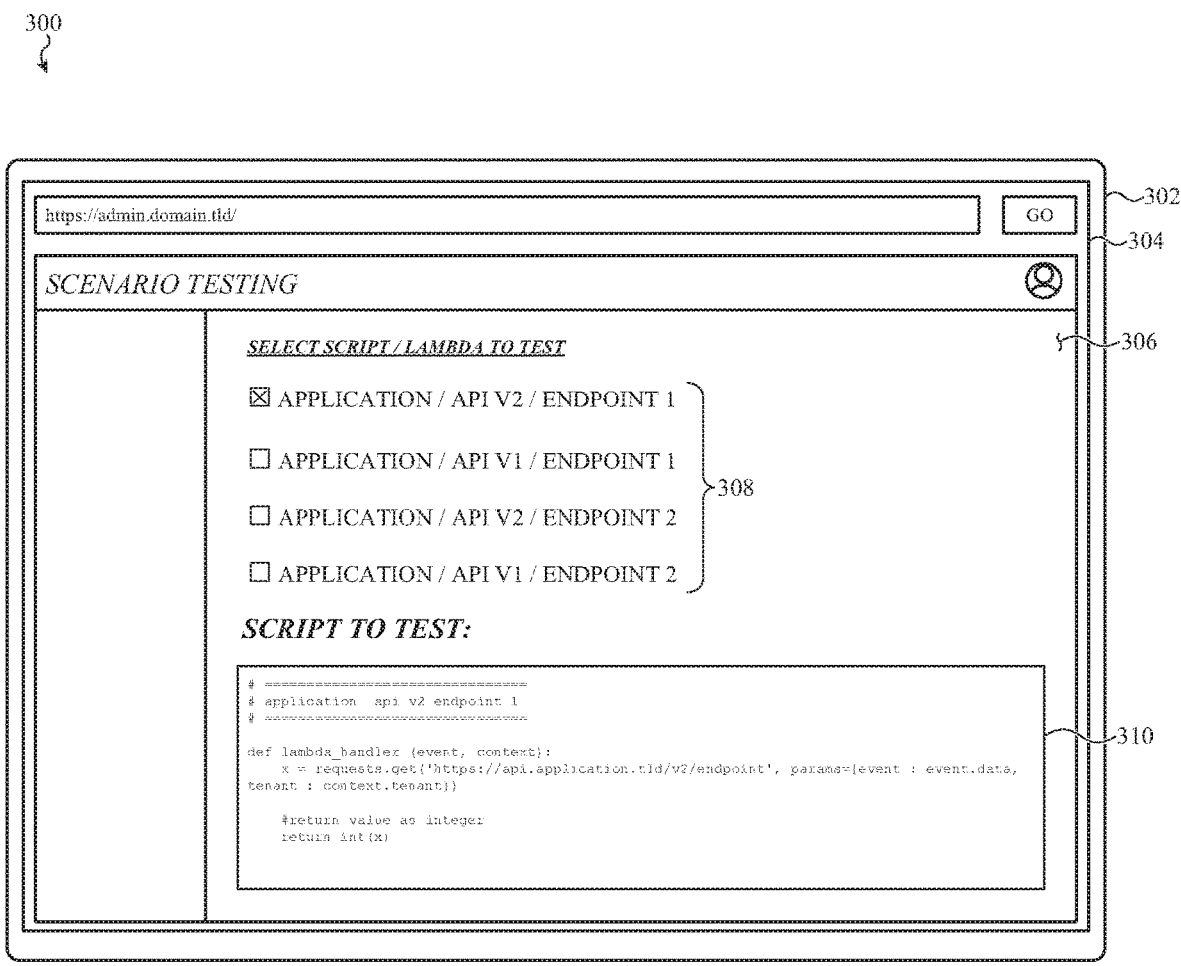
FIG. 3 depicts a client device executing an instance of a client application rendering a graphical user interface of a system configured to facilitate scenario testing of one or more serverless functions that can be executed by an access management service, such as described herein.

FIG. 3 depicts a client device executing an instance of a client application rendering a graphical user interface of a system configured to facilitate scenario testing of one or more serverless functions that can be executed by an access management service, such as described herein.

The client device 300 includes a display 302 that can be operated by an instance of software instantiated by cooperation of a processor and memory (not shown). The instance of software may be referred to as a frontend application, and may cause to be rendered on the display a graphical user interface 304. The graphical user interface 304 can include a content view area 306 in which content associated with the frontend application can be rendered.

The frontend application is configured to interface with and provide command and control instructions to an API access manager, such as described herein. In particular, the frontend application can be configured to render one or more graphical user interface elements 308 which may be selected by a user. The graphical user interface elements may correspond to selections of individual serverless functions to test, such as described above, such as the serverless function 310.

In this manner, an administrator of an API access manager service as described herein can select one or more tests to execute. Tests can include, as noted above, tests between original and refactored serverless functions, tests of different licensing scenarios, tests of different billing scenarios, and so on.

These foregoing embodiments depicted in FIG. 3 and the various alternatives thereof and variations thereto are presented, generally, for purposes of explanation, and to facilitate an understanding of various configurations and constructions of a user interface that may be associated with a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 4:
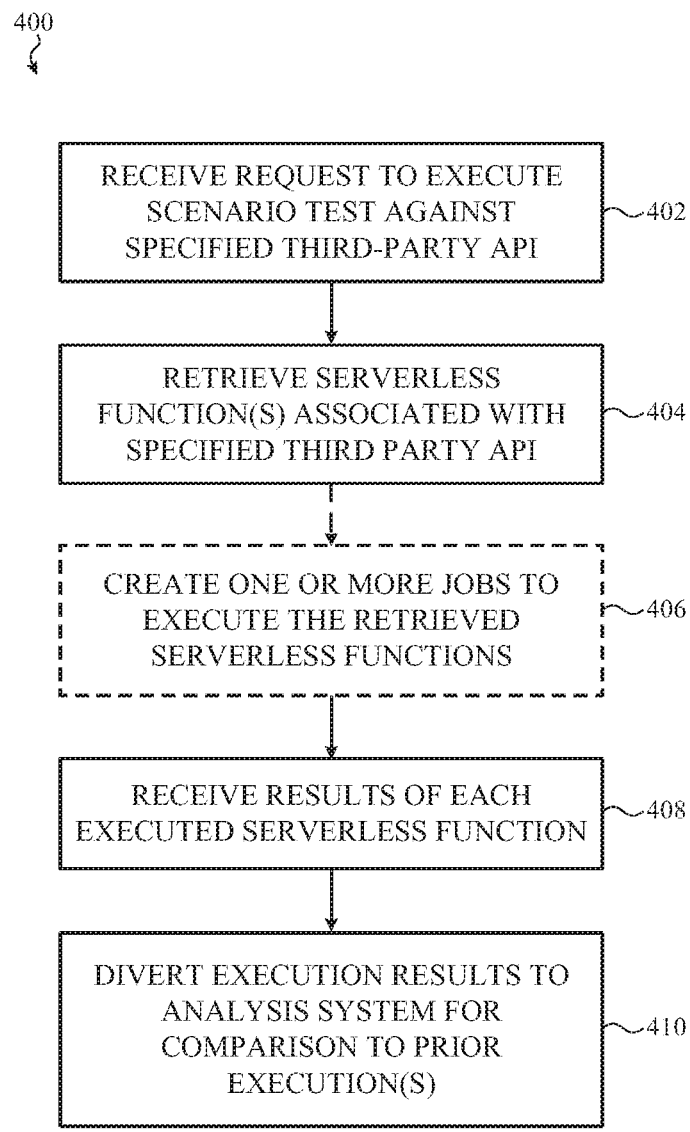
FIG. 4 is a flowchart depicting example operations of a method of operating an access management service, such as described herein.

FIG. 4 is a flowchart depicting example operations of a method of operating an access management service, such as described herein. The method can be performed by any suitable hardware or software or combination thereof.

The method 400 includes operation 402 at which a request to execute a scenario test is received. The request may relate to a particular third-party API, may relate to a particular license holder, may relate to a particular organization, or any other suitable entity.

The method 400 includes operation 404 at which one or more serverless functions associated with the information specified at operation 402 are selected. In some cases, one serverless function may be selected. In other cases, more than one serverless function may be selected. The serverless functions can be selected from a database, such as described above in reference to other embodiments described herein.

The method 400 includes operation 406, which in some examples may be optional. In embodiments including operation 406, the method 400 advances to create one or more jobs to execute the selected serverless functions. In other cases, job creation may not be required; the serverless functions may be executed in a sequence.

The method 400 includes operation 408 at which results of execution of the serverless functions are received at an aggregator. Next, at operation 410, one or more execution results can be diverted from an invoicing system or further processing system to an analysis system. The analysis system may be configured to perform one or more comparisons and/or scenario test analysis operations.

Figure 5:
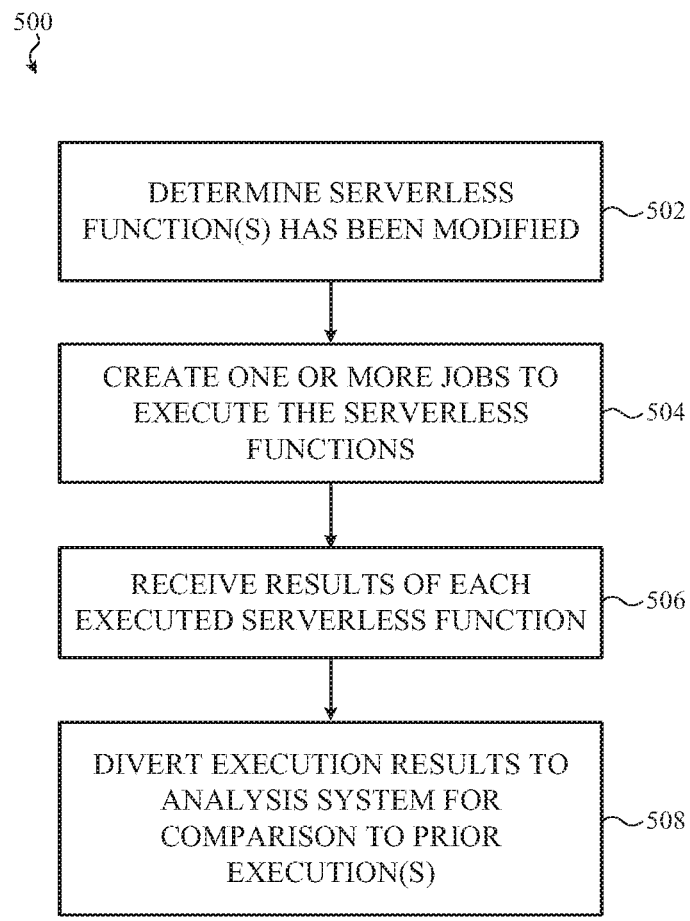
FIG. 5 is a flowchart depicting example operations of a method of triggering a scenario test operation against third-party production data, as described herein.

FIG. 5 is a flowchart depicting example operations of a method of triggering a scenario test operation against third-party production data, as described herein. As with the method 400, the method 500 can be performed by any suitable hardware or software; no particular configuration is required for all embodiments.

The method 500 includes operation 502 at which it may be determined that a particular serverless function stored by a serverless function database as described herein is modified. In this example, at operation 504 one or more comparison jobs may be created to compare execution of the modified serverless function against prior versions and/or prior executions.

In particular, at operation 506, results of execution of the created jobs can be received. Next, at operation 508, the results of the automatically-executed jobs can be diverted to an analysis system which may determine whether the updated serverless function performs the same as the original version of the same serverless function.

For example, jobs created at operation 504 may be time-limited to retrieve usage data during prior executions of the previous serverless function. In this example, the original serverless function and the modified/updated serverless function can be tested against the same range of usage data as served by a particular (or more than one) third-party API.

Figure 6:
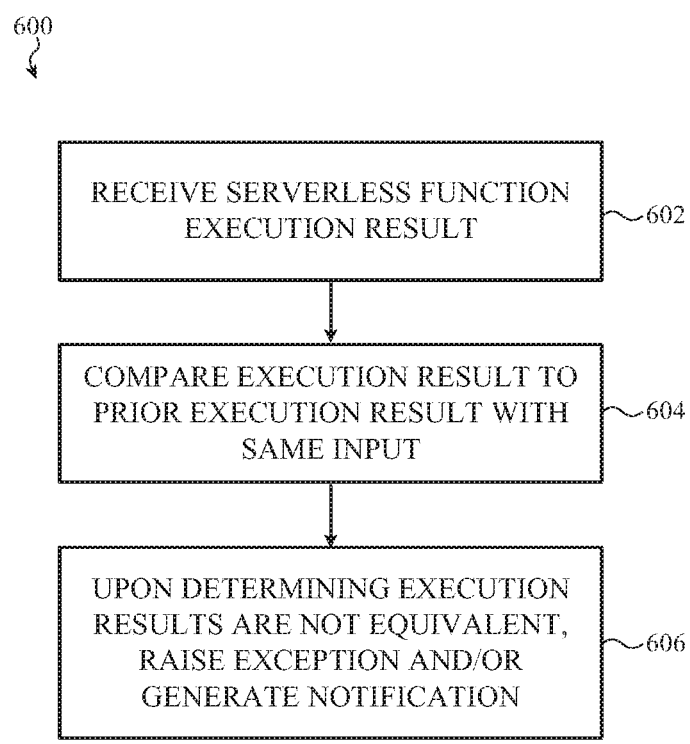
FIG. 6 is a flowchart depicting example operations of a method of operating a scenario testing system as described herein.

FIG. 6 is a flowchart depicting example operations of a method of operating a scenario testing system as described herein. As with the methods 400, 500, the method 600 can be performed by any suitable hardware or software; no particular configuration is required for all embodiments.

The method 600 includes operation 602 at which a serverless execution result is received. Next, at operation 604, the execution result is compared against a prior execution of a similar serverless function given the same inputs. Finally, at operation 606, it may be determined whether the two executions of these serverless functions (e.g., original and refactored) are identical and/or within a threshold of one another. If it is determined that the values output from these functions' execution is not identical (or within selected thresholds), an exception may be raised and/or a notification may be generated for a software developer or system administrator.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed aggregated only for legitimate, agreed-upon, and reasonable uses.

As used herein, the term "processing resource" (along with other similar terms and phrases, including, but not limited to, "computing device" and "computing network") refers to any physical and/or virtual electronic device or machine component, or set or group of interconnected and/or communicably coupled physical and/or virtual electronic devices or machine components, suitable to execute or cause to be executed one or more arithmetic or logical operations on digital data.

As described herein, the term "processor" refers to any software and/or hardware-implemented data processing device or circuit physically and/or structurally configured to instantiate one or more classes or objects that are purpose-configured to perform specific transformations of data including operations represented as code and/or instructions included in a program that can be stored within, and accessed from, a memory. This term is meant to encompass a single processor or processing unit, multiple processors, multiple processing units, analog or digital circuits, or other suitably configured computing element or combination of elements.

Similarly, the term "memory" refers to any software and/or hardware-implemented data storage device or circuit physically and/or structurally configured store digital information. This term is meant to encompass a single memory cell or unit, multiple memory blocks and systems, analog or digital circuits, or other suitably configured data or information storage element or combination of elements.

Example processing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

Further, the foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on.

The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel.

In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference an implementation in which discrete functions of the system are implemented as discrete microservices. It is appreciated that this is merely one possible implementation.

What is claimed is:

1. A computing device comprising:
a memory resource storing an executable asset; and
a processing resource operably intercoupled to the memory resource and configured to load the executable asset from the memory resource to instantiate an instance of software to:
    receive information identifying a third-party application programming interface (API) endpoint;
    retrieve, from the memory, a first serverless function that is a refactored version of a second serverless function, the first serverless function associated with the third-party API;
    instantiate a job to execute the first serverless function, software to:
        call the first serverless function with arguments to provide input to query data stored by the third-party API;
        receive a first result from the third-party API in response to the input; and
        cause the first result to be stored in the memory;
    query the memory to retrieve the first result;
    query the memory to retrieve a second result, the second result generated by executing the second serverless function with the arguments; and
    determine whether the first result is identical to the second result, and in response to determining that the first result is identical to the second result, cause to be stored in the memory an indication of identical performance of the first serverless function and the second serverless function.

2. The computing device of claim 1, wherein in response to determining that the first result is not identical to the second result, cause to be stored in the memory information indicating different performance of the first serverless function and the second serverless function.

3. The computing device of claim 1, wherein the instance of tag the job as a test execution.

4. The computing device of claim 1, wherein the input is received from an electronic device communicably coupled to the computing device.

5. The computing device of claim 4, further comprising, in response to determining that the first result is identical to the second result, causing a display of the electronic device to indicate identical function of the first serverless function and the second serverless function.

6. The computing device of claim 1, wherein the information is provided in response to a determination that the first serverless function has been modified.

7. A method of testing execution of a first function against data stored by, and to which access is controlled by, a third party, the method comprising:
    retrieving the first function from a database, the first function associated with a third-party API endpoint and being a refactored version of a second function stored in the database;
    instantiating a job to execute the first function with specified arguments, the job to:
        provide input to query data stored by the third-party API;
        receive a first result from the third-party API in response to the input; and
        cause the first result to be stored in the database;
    querying the database to retrieve the first result;
    querying the database to retrieve a second result, the second result generated by executing the second function with the specified arguments; and
    determining whether the first result is equivalent to the second result, and in response to determining that the first result is equivalent to the second result, cause to be stored in a database an indication of equivalent performance of the first function and the second function.

8. The method of claim 7, wherein the first function and the second function are serverless functions.

9. The method of claim 7, wherein the first function comprises an editable script.

10. The method of claim 7, wherein the first function is retrieved from the database in response to a determination that the first function is modified.

11. The method of claim 7, comprising determining whether the first result is identical to the second result, and in response to determining that the first result is identical to the second result, cause to be stored in the memory an indication of identical performance of the first function and the second function.

12. The method of claim 7, comprising updating a graphical user interface to indicate equivalent performance of the first function and the second function.

13. The method of claim 7, in response to determining that the first result is not equivalent to the second result, cause to be stored in a database an indication of different performance of the first function and the second function.

14. The method of claim 13, comprising updating a graphical user interface to indicate difference performance of the first function and the second function.

15. A method of testing execution of a first function that is a refactored version of a second function, the execution against data stored by, and to which access is controlled by, a third party, the method comprising:
retrieving the first function from a database, the first function associated with a third-party API endpoint;
retrieving the second function from the database, the second function associated with the third-party API endpoint;
instantiating a first job to execute the first function with specified arguments, the first job to:
provide input to query data stored by the third-party API;
receive a first result from the third-party API; and
cause the first result to be stored in the memory;
adding the first job to a job queue;
instantiating a second job to execute the second function with the specified arguments, the second job to:
provide input to query data stored by the third-party API;
receive a second result from the third-party API; and
cause the second result to be stored in the database;
adding the second job to the job queue;
querying the database to retrieve the first result;
querying the database to retrieve a second result; and
determining whether the first result is equivalent to the second result, and in response to determining that the first result is equivalent to the second result, cause to be stored in a database an indication of identical output performance of the first function and the refactored version of the first function.

16. The method of claim 15, wherein the first function and second function are serverless functions.

17. The method of claim 15, wherein the first function and second function each comprise editable scripts; and
wherein the first function and the second function are difference.

18. The method of claim 15, wherein the first job and the second job are based at least in part on a selected scenario relating to data stored by the third-party.

19. The method of claim 18, the first result and the second result are provided as input to an analysis system to compare the first result and/or the second result to at least one prior execution of the first function or the second function.

20. The method of claim 18, wherein the third party API is selected from a set of third-party APIs.

* * * * *